Feb. 22, 1938. K. J. WERSÄLL 2,109,406
FRICTION CLUTCH
Filed Aug. 4, 1937
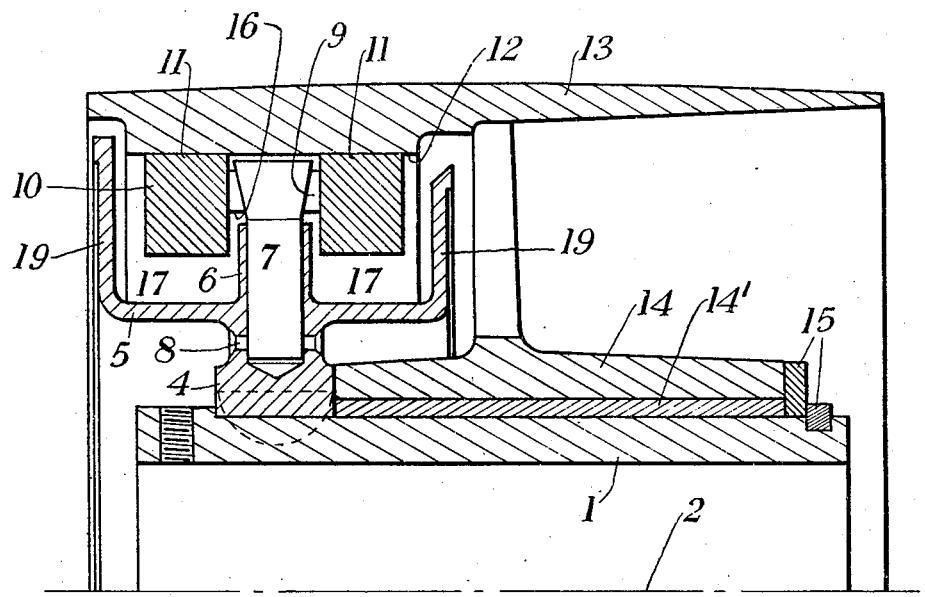
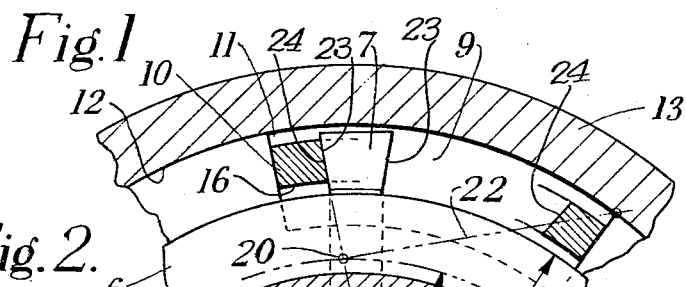
Fig.1.
Fig.2.
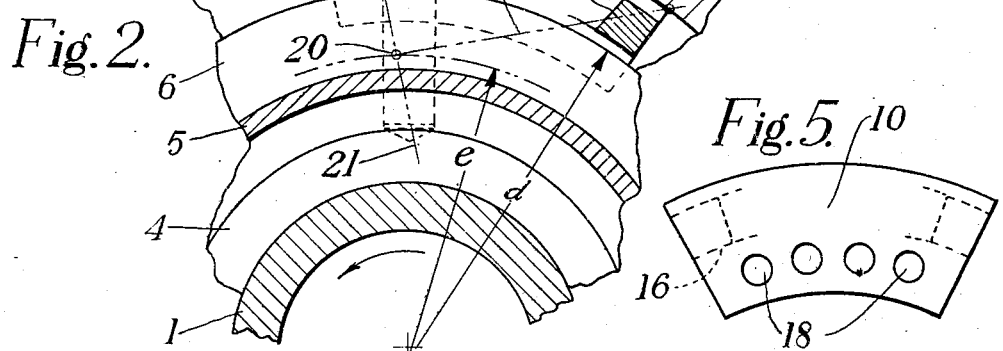
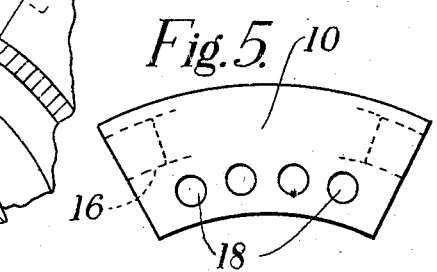
Fig.5.
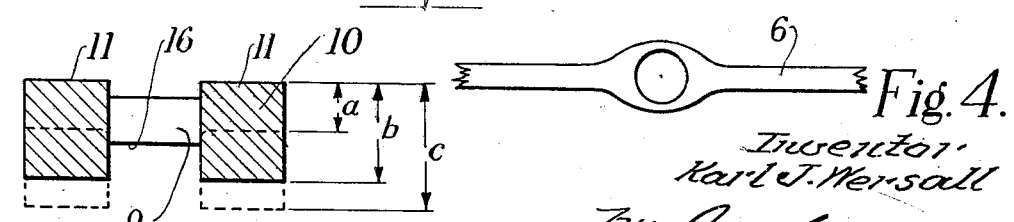
Fig.3.
Fig.4.
Inventor
Karl J. Wersäll
By
Atty.

Patented Feb. 22, 1938

2,109,406

UNITED STATES PATENT OFFICE 2,109,406

FRICTION CLUTCH

Karl Johan Wersäll, Alsten, Sweden

Application August 4, 1937, Serial No. 157,429
In Sweden December 22, 1934

3 Claims. (Cl. 192—105)

The invention relates to centrifugal clutches of the kind in which the shoes are laterally turnable and are driven by studs engaging with recesses within them.

The object of the invention is to provide a clutch of the above kind in which the maximum power which it will transmit at a given speed can be varied by alteration of the shoes without alteration of the element by which the shoes are driven. By the present invention, centrifugal clutches of the kind above referred to can be built up from standard sized track and driving elements, and, within comparatively wide limits, the maximum power that can be transmitted by a particular standard size of clutch at a given speed can be easily varied.

According to the present invention, a centrifugal clutch of the above mentioned type is so adapted that shoes of different weights, or various numbers of shoes, may be employed without necessitating alterations of the shoe driving element, as the power which the clutch can transmit, at a given speed of rotation, is proportional to the weight of the shoes. Broadly, according to the present invention, the weight of the shoes acting on the friction track of a clutch of the kind referred to is varied to control the maximum power that can be transmitted by the clutch at a given speed. In a preferred form of the invention, the maximum power capable of transmission by a standard size of clutch is varied by providing shoes of different radial thicknesses and the driving element of the clutch is adapted to receive sets of shoes of various thicknesses while permitting them to have a fixed radial movement, irrespective of their thickness. Further, the driving element is such that any number of shoes, up to a fixed maximum, can be readily applied to it.

One form of the invention is illustrated by way of example in the accompanying drawing, in which:—

Figure 1 is a longitudinal section through one half of a clutch.

Figure 2 being a somewhat diagrammatic cross-section through a portion of a clutch corresponding thereto.

Figure 3 is a sectional elevation through one shoe.

Figure 4 is a plan view of a portion of the driving element of the clutch.

Figure 5 is an elevation of a modified form of shoe.

Referring to the drawing, a sleeve 1 having its centre line at 2 can be secured to the driving shaft, not shown, and a driving element 4 is keyed to it. The driving element is in the form of a drum 5 having a central rib 6 which, at regular intervals, is thickened or provided with bosses, the thickened parts of the rib being drilled to receive driving studs 7, which are a push fit in their holes in which they are secured by cross pins 8. The upper ends of the studs are in the form of inverted conic frustra located within slots 9 in shoes 10, so that the inclined edges 23 of the studs will drivingly engage with cooperating inclined faces 24 provided on the shoes. As shown, each shoe has two side elements 11 which, when the shoes are thrown outwards, make frictional contact with a track or race 12, which is formed as the inner surface of the driven element, in this case, a pulley 13. The boss 14 of the pulley is mounted to rotate on the sleeve 1 through the intermediary of a bush 14'. The pulley, boss and the bush are maintained against axial displacement by the rings 15.

The inward radial movement of the shoes is limited by the surfaces 16 of each shoe making contact with the periphery of the rib 6, so that a space 17 exists between the drum 5 of the driver and the under sides of the shoes. The space 17 permits shoes of varying depths, for example, of depths $a$, $b$ and $c$, as indicated in Figure 3, to be accommodated without necessitating alteration of the driver, while, irrespective of their depth, the shoes can have only a definite radial movement to and from the track or race 12. As the power that can be transmitted by the clutch at a given speed is dependent upon the weight of the shoes, it will be appreciated that this arrangement permits a clutch, which comprises a standard size driver and pulley, to be adapted for the transmission of various maximum powers, at a given speed, by merely inserting sets of shoes of the required thicknesses.

As an alternative to using shoes of different thickness for the transmission of different maximum powers, shoes such as shown in Figure 5 may be employed. These shoes are of fixed over-all dimensions, but their weights are varied by drilling holes 18 in them. The holes are preferably drilled symmetrically about the radial centre lines of the shoes to maintain their balance.

Again the weights of the shoes can be varied by alteration of the widths of the shoes. Referring to Figure 1, it will be seen that the shoes are enclosed by flanges 19 on the drum 5, but ample space is provided to permit shoes of increased width to be used.

Furthermore, as the shoes can be readily removed from their studs, the maximum power which can be transmitted can be varied by alteration of the number of shoes employed.

In these clutches, it is desirable that the radial play of the shoes shall not be excessive in order that impact of the shoe on the friction track shall not be too great. The radial play of the shoes is determined by the diameter of the rib 6 and it should not be less than twice the radius $e$ indicated in Figure 2. This minimum diameter is that of a circle passing through the point 20 which is obtained by producing the contact surface between the stud and shoe as shown at 21 and drawing a normal 22 to this line, the normal passing through the trailing edge of the shoe when it is in contact with the friction track. In practice, the diameter of the rib is made substantially greater than this minimum, for example, the rib may have a radius $d$.

When the clutch is in operation, should a shoe meet with any slight obstruction on the friction track, it is free to turn laterally, pivoting around its driving stud.

I claim:

1. A centrifugal clutch comprising an outer friction track member, an inner driving drum, studs located within and carried by said driving member to engage with and drive exchangeable friction shoes which are adapted to engage drivingly with said track under centrifugal action and which are laterally turnable about said studs, a radially projecting peripheral rib on said driving drum to support said studs, and a stop on each shoe adapted to engage with said rib to limit the radial movement of said shoes independently of the degree to which the shoes extend radially inwards beyond the periphery of the rib, said driving drum having accommodation on either side of said rib for depending shoe portions of various sizes.

2. A centrifugal clutch comprising a friction track, a driving drum, studs located within and carried by said driving drum to engage with and drive exchangeable friction shoes which are adapted to engage drivingly with said track under centrifugal action and which are laterally turnable about said studs, said driving drum having accommodation within it for shoes of different radial thicknesses, and said shoes, having stop faces at a predetermined radial distance from their friction faces and distinct from their innermost faces, a stop on the driving drum to cooperate with the stop faces to determine the radial movement of said shoes irrespective of their different radial thicknesses.

3. A centrifugal clutch comprising a friction track, a driving drum, studs located within and carried by said driving drum to engage with and drive exchangeable friction shoes which are adapted to engage drivingly with said track under centrifugal action and which are laterally turnable about said studs, a radially projecting peripheral rib on said driving drum to support said studs, said rib having a radius which is at least as long as the distance from the center of the clutch to a point at which a line representing the produced plane of contact of a shoe and stud, intersects a normal drawn to said line and passing through the point of contact of the trailing edge of the shoe with the track, and a stop on each shoe adapted to engage with said rib to limit the radial movement of said shoes independently of the degree to which the shoes extend radially inwards beyond the periphery of said rib, said drum having accommodation on either side of said rib for depending shoe portions of various sizes.

KARL JOHAN WERSÄLL.